United States Patent
DiGiovanni et al.

(10) Patent No.: US 6,768,849 B2
(45) Date of Patent: Jul. 27, 2004

(54) SYSTEMS AND METHODS FOR FABRICATING VARYING WAVEGUIDE OPTICAL FIBER DEVICE

(75) Inventors: David John DiGiovanni, Montclair, NJ (US); Andrew D. Yablon, Livingston, NJ (US); Man Fei Yan, Berkeley Heights, NJ (US)

(73) Assignee: Fitel USA Corp., Norcross, GA (US)

( * ) Notice: Subject to any disclaimer, the term of this patent is extended or adjusted under 35 U.S.C. 154(b) by 33 days.

(21) Appl. No.: 10/190,134

(22) Filed: Jul. 3, 2002

(65) Prior Publication Data

US 2004/0005128 A1 Jan. 8, 2004

(51) Int. Cl.[7] .................................................. G02B 6/02
(52) U.S. Cl. ........................ 385/123; 385/124; 385/127; 385/142; 65/385; 65/414
(58) Field of Search ................................ 385/123–128, 385/141–145, 50; 65/385, 414, 407, 409, 412

(56) References Cited

U.S. PATENT DOCUMENTS

| | | | |
|---|---|---|---|
| 4,351,658 A | * | 9/1982 | Olshansky .................... 65/430 |
| 4,413,882 A | | 11/1983 | Bailey et al. |
| 5,446,820 A | | 8/1995 | Ishikawa et al. |
| 5,655,046 A | * | 8/1997 | Todoroki et al. ........... 385/144 |
| 6,392,789 B1 | | 5/2002 | Paek et al. |

FOREIGN PATENT DOCUMENTS

| | | |
|---|---|---|
| EP | 0895103 A1 | 2/1999 |
| EP | 0902308 A1 | 3/1999 |
| EP | 1202090 A1 | 5/2002 |
| GB | 2347759 A | 9/2000 |
| JP | 02139504 | 5/1990 |
| JP | 11038238 | 2/1999 |

* cited by examiner

*Primary Examiner*—Phan T. H. Palmer
(74) *Attorney, Agent, or Firm*—Priest & Goldstein, PLLC

(57) ABSTRACT

Systems and methods are described for fabricating a varying-waveguide optical fiber. In one described method, a preform is fabricated having a core and at least one cladding region. The cladding region has a higher viscosity and the core region has a lower viscosity. The relative viscosities of the cladding region and core are chosen such that, when tension is applied to an optical fiber drawn from the preform, the applied tension is primarily borne by the cladding region thereby causing a viscoelastic strain to be frozen into the cladding region, while creating a minimal viscoelastic strain in the core. The method further includes drawing the preform into an optical fiber under an applied tension, such that a viscoelastic strain is frozen into the cladding region the frozen-in viscoelastic strain decreasing the cladding region refractive index. The cladding region refractive index is changed in a section of the optical fiber by heating the section so as to relax the viscoelastic strain frozen into the cladding region in the section of fiber, thereby increasing the cladding region refractive index in the section of fiber.

24 Claims, 16 Drawing Sheets

ORIGINAL MODEFIELD AT 1310 nm

EXPANDED MODEFIELD AT 1310 nm

US 6,768,849 B2

SYSTEMS AND METHODS FOR FABRICATING VARYING WAVEGUIDE OPTICAL FIBER DEVICE

FIELD OF THE INVENTION

The present invention relates generally to the field of fiber optics, and particularly to advantageous aspects of systems and methods for fabricating a varying waveguide optical fiber device.

DESCRIPTION OF PRIOR ART

Optical fibers are thin strands of glass material designed to carry optical signals long distances at high bandwidth. Optical fibers are typically cylindrically symmetric structures, including an inner core region and one or more distinct cladding regions outside the core region. As used herein, the terms "cladding" and "cladding region" refer generally to regions of an optical fiber outside of the core region. Depending upon the particular fiber design, a cladding region may not necessarily have an annular cross section and may not necessarily be radially symmetric. One or more of the core and cladding regions are typically doped with various chemicals at various concentrations to create a desired refractive index profile.

One device that is useful for a number of applications is an optical fiber having a refractive index profile that varies along its length. Various approaches have been developed to fabricate such a device. In one approach, the refractive index profile of an optical fiber is modified by altering the fiber diameter to produce a physical tapering of the fiber. In a second approach, dopants in an optical fiber are diffused to modify the fiber's refractive index profile. In a third approach, an optical fiber's refractive index profile is modified by irradiating the fiber with high intensity UV radiation.

However, there are a number of known disadvantages of the prior art. Depending upon the particular technique used, it may be difficult to obtain a desired change in refractive index in a short length of fiber. Also, it may be difficult to precisely control the modulation of the refractive index profile in a length of fiber.

SUMMARY OF THE INVENTION

Aspects of the present invention provide systems and methods for fabricating a varying-waveguide optical fiber. In one method according to an aspect of the invention, a preform is fabricated having a core and at least one cladding region. The cladding region has a higher viscosity and the core region has a lower viscosity. The relative viscosities of the cladding region and core are chosen such that, when tension is applied to an optical fiber drawn from the preform, the applied tension is primarily borne by the cladding region, thereby causing a viscoelastic strain to be frozen into the cladding region, the frozen-in viscoelastic strain decreasing the cladding region refractive index and producing a net change of the cladding region refractive index relative to the core refractive index. The method further includes drawing the preform into an optical fiber under an applied tension, such that a viscoelastic strain is frozen into the cladding region, the frozen-in viscoelastic strain decreasing the cladding region refractive index. The cladding region refractive index is changed in a section of the optical fiber by heating the section so as to relax the viscoelastic strain frozen into the cladding region in the section of fiber, thereby increasing the cladding region refractive index in the section of fiber. This heating may also cause a relaxation of elastic stresses frozen into the core region, thereby inducing small changes in the core refractive index.

Additional features and advantages of the present invention will become apparent by reference to the following detailed description and accompanying drawings.

DETAILED DESCRIPTION

Figure 1:
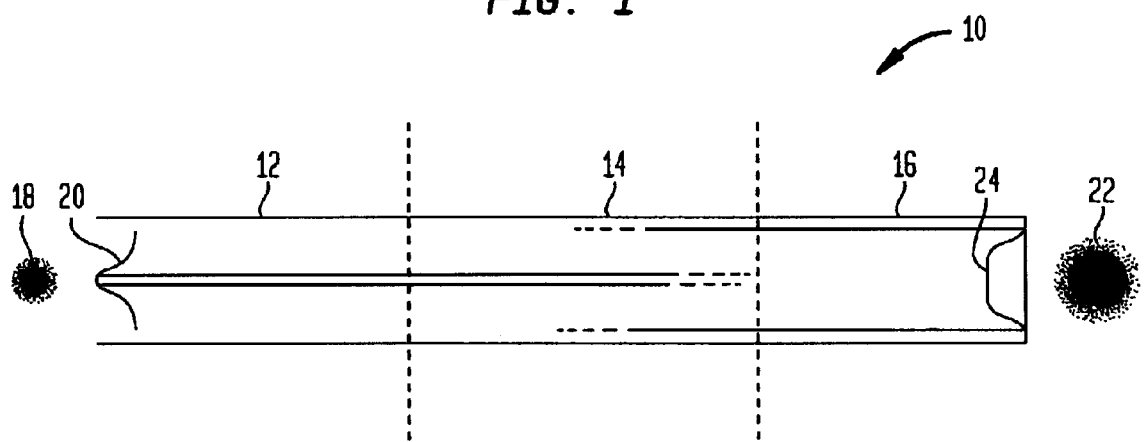
FIG. 1 shows a diagram of a beam expander according to an aspect of the invention.

Aspects of the invention provide systems and methods for fabricating a varying-waveguide optical fiber by modulating an optical fiber's frozen-in viscoelastic strain state. As described below, because of the photoelastic effect, modulating the frozen-in strain state produces a corresponding modulation of the fiber's refractive index. Further aspects of the invention provide systems and methods for fabricating varying-waveguide optical devices, including a beam expander, a bridge fiber, and a fiber grating. In addition, an aspect of a related invention provides a technique for low-loss splicing of optical fibers.

Optical fiber is typically fabricated from a silica ($SiO_2$) based glass material. A suitable preform is constructed, typically including doped core and cladding regions. The preform is then softened in a furnace and drawn into fiber. Because of the physical properties of glass, the drawn fiber has substantially the same refractive index profile as the preform, scaled to the diameter of the drawn fiber. After the fiber has been drawn, it may be coated with a polymeric material.

Applying tension to an optical fiber as it is drawn induces elastic and viscoelastic strains in the fiber. For the purposes of this discussion, elastic deformations can be considered to occur instantaneously and relax instantaneously when the applied tension is removed. Viscoelastic strains, on the other hand, are time-dependent, and are "frozen" into the fiber if the fiber is cooled sufficiently quickly before the viscoelastic strains can relax. Frozen-in strains will persist even after the applied tension is removed. Subsequently heating the fiber to a temperature near or above the fiber's strain point in the absence of applied tension causes frozen-in viscoelastic strains to relax over time. The relaxation process appears to exhibit an exponential dependence between time and temperature. Higher temperatures require significantly less time for the completion of the relaxation.

A modified, or entirely new viscoelastic strain state may be frozen into an optical fiber after the fiber has already been drawn by heating the fiber close to its strain point or above and applying tension to the heated fiber. The strain point is defined as the temperature at which the glass viscosity has the value $10^{14.6}$ Poise and is approximately 1,100° C. for high purity $SiO_2$. The applied tension affects the fiber's strain state. Changes to the strain state can then be frozen into the fiber by allowing it to cool while maintaining the applied tension, or otherwise preventing the strain from relaxing out of the fiber. By applying tensions larger than the original draw tension, it is possible to freeze in viscoelastic strains that are larger than the original draw-induced viscoelastic strains.

It should be noted that frozen-in viscoelastic strain is distinct from residual elastic strains associated with residual elastic stresses such as residual draw-induced or thermal stresses. Residual draw-induced and thermal stresses typically arise from differing physical properties of abutting regions of an optical fiber and have been analyzed in the literature. Differences in viscosity or thermal properties, for example, may result in tension or compression occurring between abutting regions when the fiber is drawn and cooled. However, frozen-in viscoelastic strains produce changes in an optical fiber's refractive index profile that cannot be accounted for by residual draw-induced or thermal stresses alone. Generally, frozen-in viscoelastic strains are also accompanied by elastic strains resulting from residual elastic stress. In certain situations, the frozen-in viscoelastic strains produce a much larger refractive index change than the residual elastic strains.

A fiber's frozen-in strain state is related to its refractive index through the so-called "photoelastic effect." Elastic and viscoelastic strains are not volume conserving. The volume of stretched glass is slightly larger than the volume of unstretched glass. Thus, the density and hence the refractive index of the stretched glass is lower than that of unstretched glass. As mentioned above, heating an optical fiber to its strain point or above permits frozen-in viscoelastic strains, as well as residual elastic stresses, to relax over time. Thus, an optical fiber with a refractive index profile that is modulated along its length can be created by: (1) freezing a viscoelastic strain into an optical fiber and (2) applying heat to the optical fiber so as to cause a modulated relaxation of the frozen-in viscoelastic strain. As discussed above, freezing a viscoelastic strain into an optical fiber can be accomplished, for example, by applying tension to the fiber as it is drawn, or by subsequently heating the fiber to its strain point or above, applying tension to the fiber, and allowing the fiber to cool before viscoelastic strains can relax out of the fiber. As described below, the heat source used to relax a frozen-in viscoelastic strain may be modulated in a number of different ways, including for example moving the heat source relative to the fiber according to a predetermined velocity profile. In addition, it is also possible to create a modulated refractive index profile by modulating the applied tension used to create the viscoelastic strains, or by modulating both the applied tension and the applied heat.

As mentioned above, a typical optical fiber has a core region and at least one cladding region. According to a further aspect of the invention, the fiber is doped to have one region with a viscosity that is significantly lower than the other fiber regions. Doping typically reduces the viscosity of a fiber region. Thus, a higher viscosity region can be created by using pure silica, or lightly doped silica for that region, while using relatively heavily doped silica for the other regions. The relative viscosities are chosen such that, when tension is applied to the fiber, the higher-viscosity region bears the brunt of the applied tension. This doping scheme causes viscoelastic strain to be frozen primarily into the higher-viscosity region, while creating minimal viscoelastic strains in the lower-viscosity regions, although large residual elastic stresses may occur there. Thus, using heat to modulate frozen-in viscoelastic strains in the fiber causes a modulation of the refractive index primarily in the higher-viscosity region. As described below, this technique is useful in fabricating a number of different optical devices.

The magnitude of the refractive index changes can be significantly enhanced by reducing the cross-sectional area of the higher-viscosity region relative to the cross-sectional areas of the lower-viscosity regions. The effective stress in the higher-viscosity region will be relatively large so that relatively large viscoelastic strains can be frozen into the fiber. By designing the fiber such that higher-viscosity regions are near, or part of, the fiber core, relatively large changes in the refractive index near the core can be achieved by modulating the frozen-in viscoelastic strains. In this case, it is helpful to be able to fabricate the fiber cladding from a lower-viscosity glass.

The above-described techniques may be used to construct a number of different optical devices, including a beam expander, a bridge fiber, and a fiber grating. In addition, the above-described techniques may be used to perform low-loss splicing between optical fibers. Each of these applications is described below.

EXAMPLE 1

Beam Expander

According to an aspect of the invention, modulation of frozen-in viscoelastic strains is used to fabricate a beam expander. A beam expander is an optical device that increases spot size of a beam of light propagating through it. A beam expander device is useful, for example, for coupling optical energy between a single mode fiber (SMF) and another device with a larger spot size, such as a laser diode. Beam expanders are also useful for coupling together fibers containing high optical powers since an expanded beam diameter results in a significant reduction in local optical intensity. Finally, an expanded beam can be made more collimated than a small diameter beam, thus permitting long distance free-space propagation. Beam expanders have been fabricated using bulk optical elements (i.e., lenses), thermal diffusion of refractive index dopants, and gradient-index fiber lenses.

FIG. 1 is a diagram of a beam expander 10 according to an aspect of the invention. The beam expander 10 has three sections, each with a distinct refractive index profile: a single-mode core section 12, a transition section 14, and a multimode core section 16. The single-mode core section 12 has a refractive index profile that provides a modefield 18 with a diameter suitable for single-mode optical signal transmission. A Gaussian curve 20 is used to illustrate the local position of the single-mode modefield 18. The multimode core section 16 has a refractive index profile that provides an expanded modefield 22. A second Gaussian curve 24 is used to illustrate the position of the multimode modefield 22. The transition section 14 has a refractive index profile that is modulated to provide a smooth, adiabatic transition between the single-mode and multimode modefields 18 and 22. An "adiabatic" transition is a transition without significant optical loss.

The beam expander 10 is fabricated from a single length of optical fiber. The three sections 12, 14 and 16 of the beam expander 10 are created by using heat and possibly tension to manipulate frozen-in viscoelastic strains in the fiber. An aspect of the aspect includes the following phases:

(a) fabricating a suitable preform;
(b) drawing the preform into optical fiber under applied tension to cause viscoelastic strains in the fiber;
(c) cooling the fiber rapidly to freeze in the viscoelastic strains;
(d) cutting a length of the drawn fiber; and
(e) applying heat and possibly tension to the length of drawn fiber to create a modulation of the refractive index profile of the fiber along its length.

Figure 2:
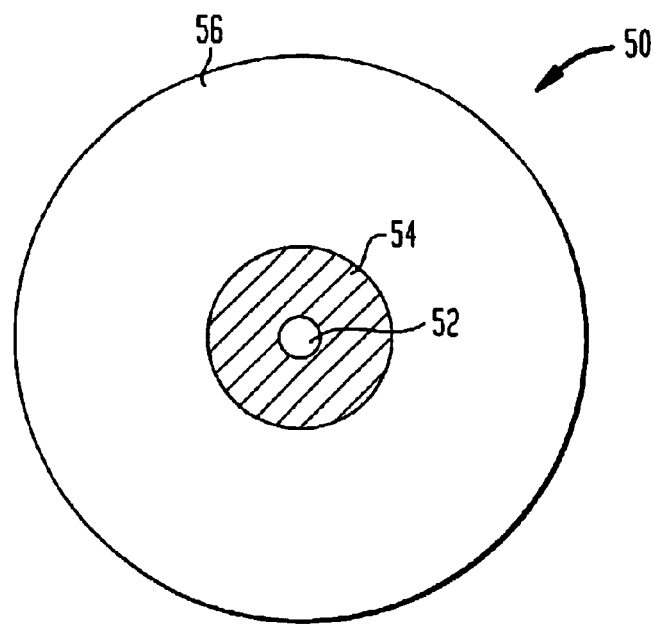
FIG. 2 shows a radial cross section of a preform that may suitably used to fabricate the beam expander shown in FIG. 1.
Figure 3:
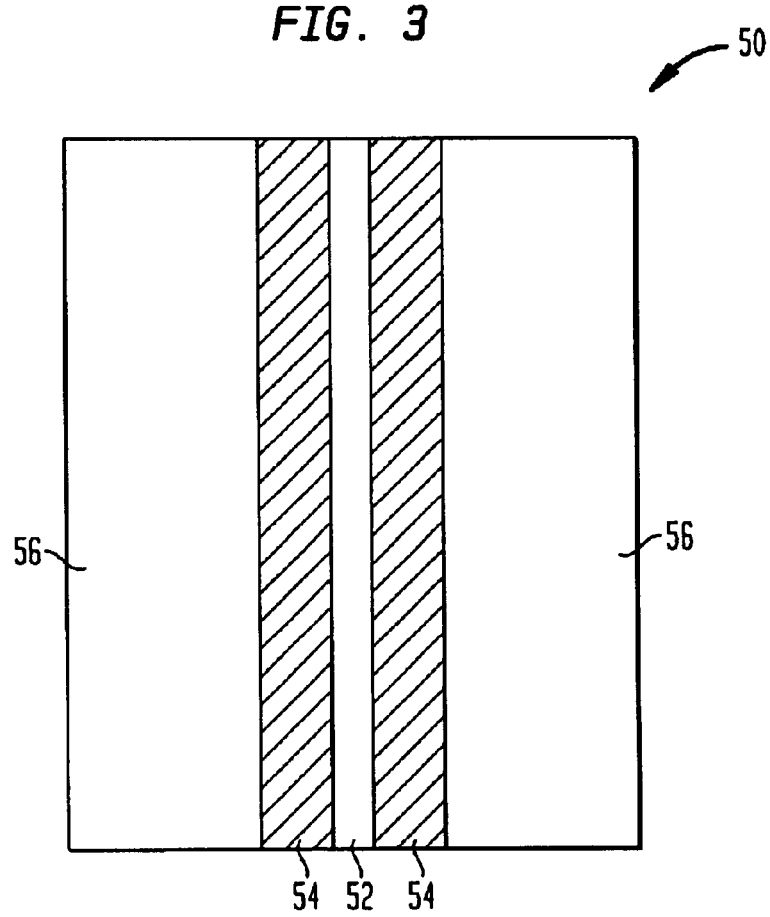
FIG. 3 shows a longitudinal cross section of the preform shown in FIG. 2.

The process begins with the preparation of a suitable preform. FIG. 2 shows a radial cross section diagram of a suitable preform 50 according to an aspect of the invention, and FIG. 3 shows a longitudinal cross section diagram of the preform 50, not drawn to scale. As shown in FIGS. 2 and 3, the preform includes a core region 52, an annular cladding region 54 surrounding the core region 52, and an annular overcladding region 56 surrounding the cladding region 54. For purposes of illustration, the annular cladding region 54 is drawn with cross-hatching.

Figure 4:
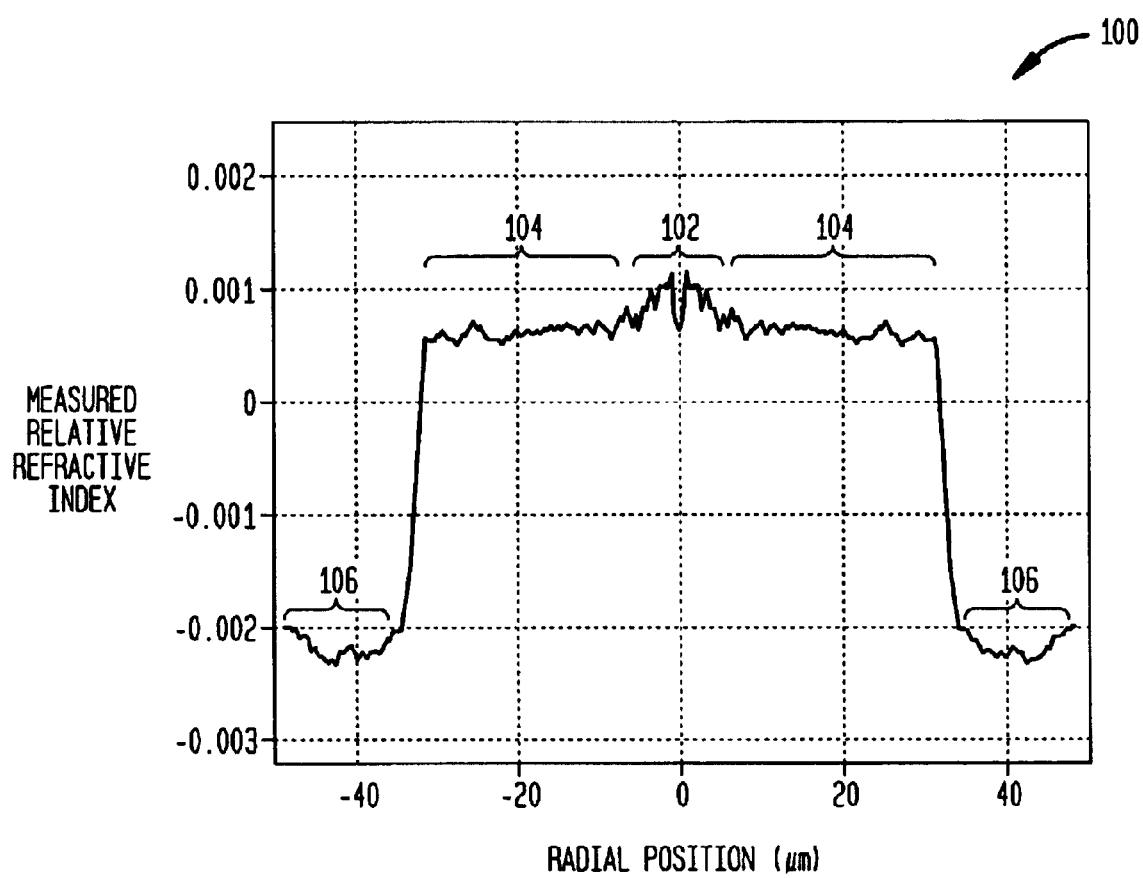
FIG. 4 shows the refractive index profile of a preform corresponding to FIGS. 2 and 3.

The three regions 52, 54, and 56 are doped to manipulate the regions' respective refractive indices and their respective viscosities. FIG. 4 shows a refractive index profile 100 for the preform 50. Because of the physical properties of glass, the relative sizes of the preform regions 52, 54, and 56 will remain substantially the same in an optical fiber drawn from the preform 50, scaled to the smaller diameter of the drawn fiber. Thus, for purposes of illustration, the refractive index profile 100 shown in FIG. 4 has a radial axis that is scaled to show the data in terms of the radial coordinates of an optical fiber drawn from the preform.

A preform is typically fabricated using a vapor deposition process that does not introduce any viscoelastic strains. Thus, the refractive index profile for the preform 100 is also the refractive index profile for an optical fiber drawn from the preform, scaled to the different diameters, assuming that any frozen-in viscoelastic strains or residual draw-induced stresses have been relaxed out of the fiber, and assuming that there have occurred no other events, such as dopant diffusion, that would affect the fiber's refractive index profile.

As shown in FIG. 4, the refractive index profile 100 includes a central slightly elevated region 102 corresponding to the core 52 of the preform 50, a pair of "shoulders" 104 corresponding to the cladding region 54, and a pair of "arms" 106 corresponding to the overcladding region 56. It will be seen that the refractive index of the cladding region 104 is only 0.0005 lower than the refractive index of the core region 102, but 0.003 higher than the refractive index of the overcladding region 106. In the present example, the drawn fiber has a core region diameter of 8 microns, and a cladding region diameter of 66 microns. As predicted by numerical simulations, and as shown by measurements, an optical fiber with the refractive index profile 100 shown in FIG. 4 has a fundamental mode Petermann II spot diameter of approximately 40 microns at a signal wavelength of 1550 nm. The spot diameter will be maximized when the central region 102 has nearly the same refractive index as the shoulders 104. A large spot diameter facilitates free space collimation, tolerates larger lateral misalignments, and exhibits a low power density relative to standard single-mode fiber.

As discussed below, in addition to having the refractive index profile 100 shown in FIG. 4, the preform 50 is also doped such that the cladding region 54 has a significantly higher viscosity than the core region 52 and overcladding region 56. One way of achieving the desired refractive index profile and relative viscosities in the preform 50 is to dope the core region 52 with phosphorus glass or a mixture of germania and fluorine, while using pure silica for the cladding region 54 and using a low-viscosity, heavily down-doped tube for the overcladding region 56. Also, the overcladding region 56 may be heavily doped with fluorine to impart a desired refractive index and viscosity.

Figure 5:
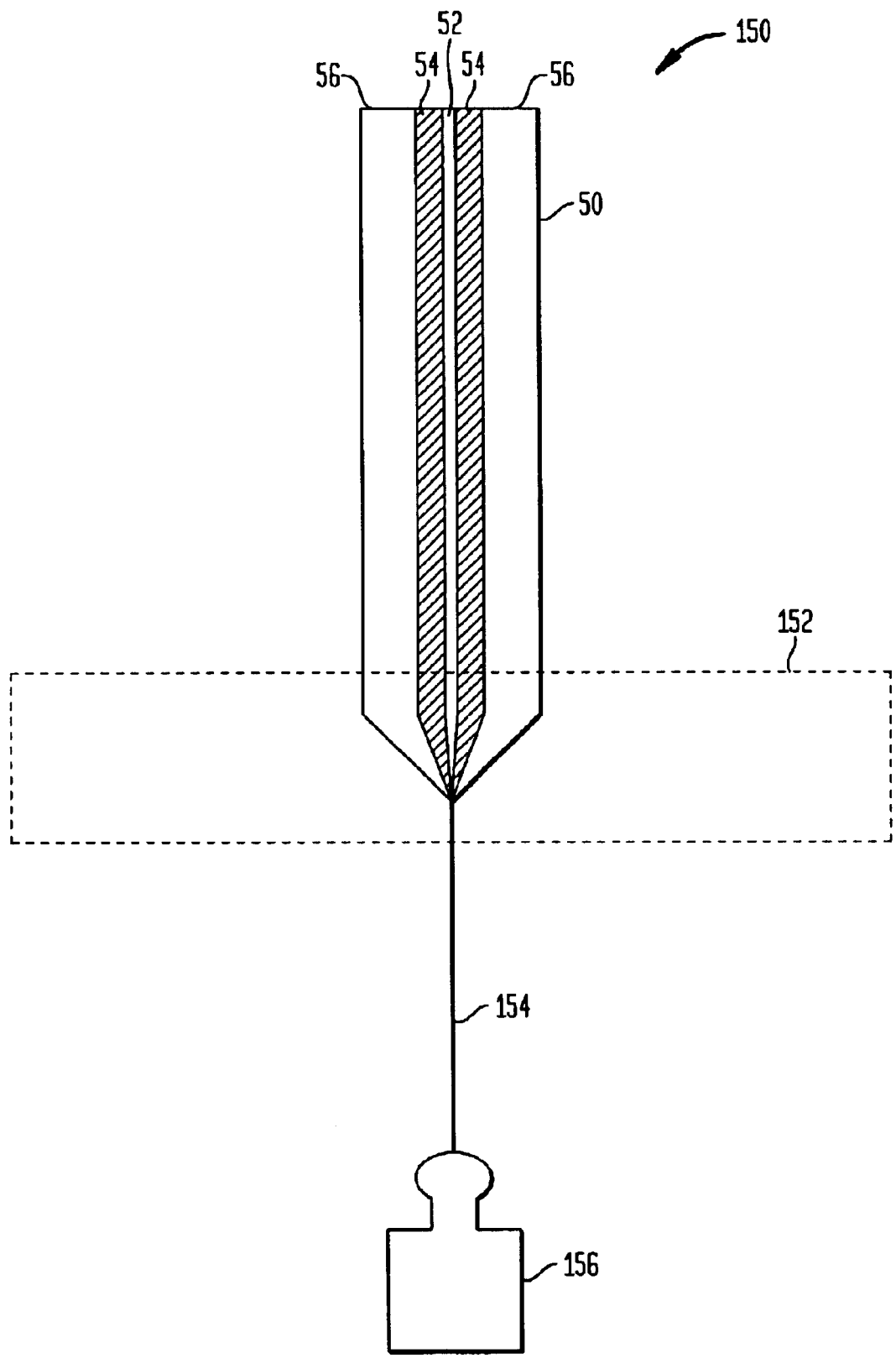
FIG. 5 shows a diagram of a fiber drawing setup that may suitably be used to draw optical fiber, under applied tension, from the preform shown in FIGS. 2 and 3.

FIG. 5 shows a diagram of an optical fiber drawing setup 150 according to a further aspect of the invention. As shown in FIG. 5, the preform 50 is loaded into a furnace, where it is gradually lowered into a hot zone 152 that heats the lower end of the preform to a temperature that softens it, allowing optical fiber 154 to be drawn from the preform 50. As illustrated schematically in FIG. 5, a weight 156 or other mechanism is used to apply tension to the optical fiber 154 as it is drawn. In the present example, the amount of applied tension is approximately 300 grams, although other tensions may suitably be used.

As discussed above, the preform 50 is doped such that the cladding region 54 has a significantly higher viscosity than the respective viscosities of the core and overcladding regions 52 and 56. Thus, the cladding region 54 bears the brunt of the applied tension 156. The resulting viscoelastic strain in the cladding region 54 is then frozen into the fiber 154 by rapidly cooling the fiber 154 before the strain state can relax out of the fiber. Because the applied tension 156 is borne primarily by the cladding region 54, relatively little, if any, viscoelastic strain is frozen into the core or overcladding regions 52 and 56.

Figure 6:
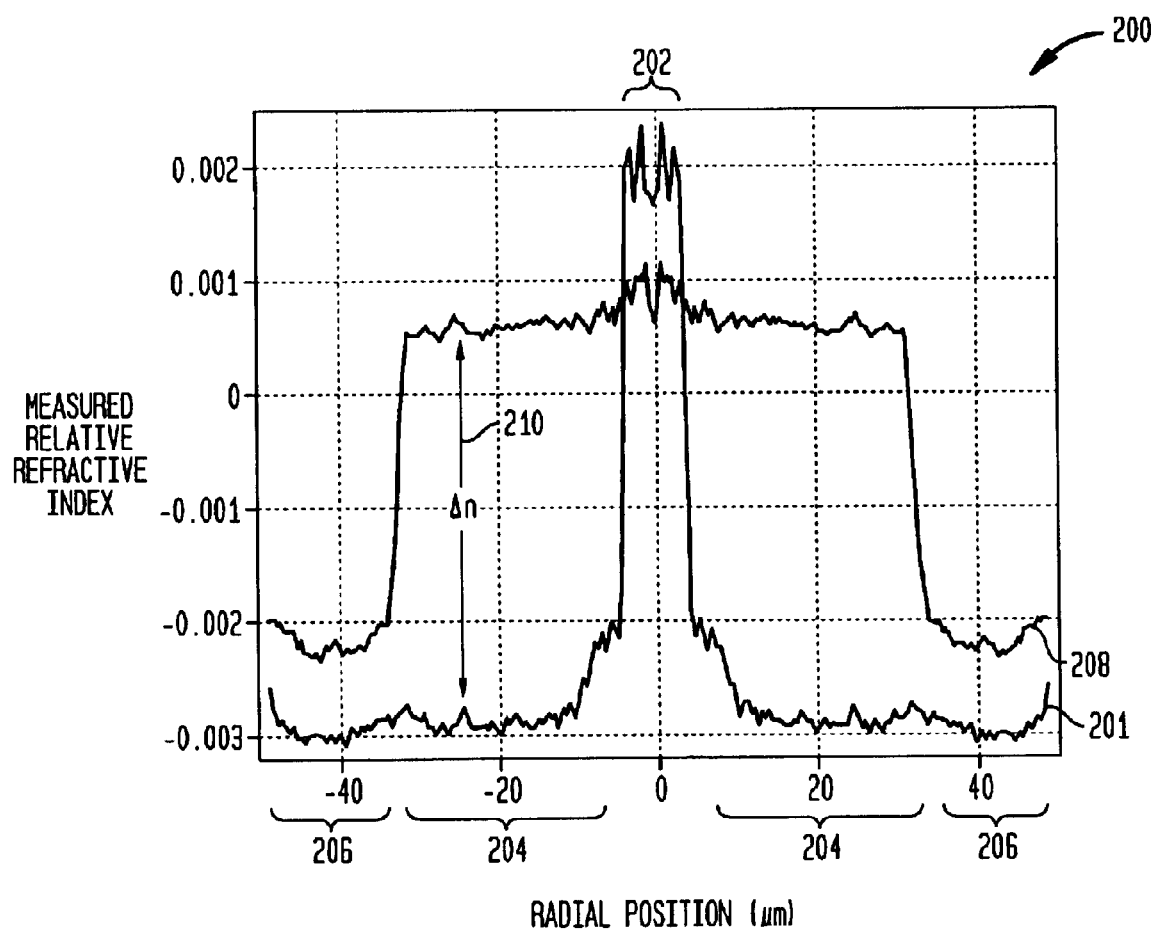
FIG. 6 shows the "as-drawn" refractive index profile of an optical fiber drawn from a preform corresponding to FIGS. 2 and 3 using the fiber drawing setup shown in FIG. 5.

Because of the photoelastic effect, drawing the preform 50 into optical fiber under applied tension 156 will cause a large change in the refractive index of the cladding region 54, while imparting smaller changes to the core and overcladding regions 52 and 56. FIG. 6 is a graph 200 showing "as-drawn" refractive index profile 201 of the optical fiber. Again, the refractive index profile 201 includes section 202, 204 and 206 corresponding to the core, cladding, and overcladding regions 52, 54 and 56 of the drawn fiber. For ease of comparison, the refractive index profile shown in FIG. 4 is superimposed as trace 208. A double-headed arrow 210 is used to illustrate the change in refractive index An of the cladding region 54. As shown in FIG. 6, in the as-drawn optical fiber, the refractive index of the cladding region 54 has decreased by approximately 0.0036.

As further shown in FIG. 6, in addition to causing a decrease in the refractive index of the cladding 204, the draw process also causes a slight increase in the refractive index of the core 202. The smaller refractive index increase (0.001) in the core region 52 is understood to result from residual draw-induced elastic stress. The increase in the core refractive index is favorable, because it increases the difference between the core region refractive index and the cladding refractive index, thereby facilitating the single-mode operation of the as-drawn fiber. It should be noted, however, that it may be possible to practice the present invention even where there is no increase in core refractive index, or where the change in the core refractive index is unfavorable. Large residual stresses can arise in low-viscosity regions, such as a doped core, when their cross-sectional areas are small. Increasing the cross-sectional area of the low-viscosity regions relative to the high-viscosity regions can reduce the residual elastic stress in low-viscosity regions while still permitting large viscoelastic strains, and their associated refractive index changes, to be frozen into the high-viscosity regions of the fiber.

It will be seen in the FIG. 6 as-drawn refractive index profile 201, the cladding region 54 in the fiber, as drawn, has a refractive index that is 0.005 lower than the refractive index of the core region 52. For the refractive index profile 201 shown in FIG. 6, numerical simulations predict a Petermann II spot diameter of 10.3 microns at a signal wavelength of 1550 nm. This diameter is suitable for single-mode optical signal transmission, and is comparable to a standard single-mode optical fiber (SMF), which has a spot diameter of 10.5 microns at a signal wavelength of 1550 nm.

Once the fiber has been drawn and cooled, heat is then applied to a length of fiber to create a desired modulation of the fiber's refractive index along its length. As mentioned above, heating the fiber near or above its strain point, in the absence of tension, causes the frozen-in viscoelastic strain and residual elastic stress to relax. The strain point is approximately 1,100° C. So long as a section of fiber is maintained near this temperature or above, the refractive index of the cladding region of the section gradually increases as a function of time from its depressed, as-drawn level to its relaxed, equilibrium level while the respective refractive indices of the core and overcladding regions are less affected. If the section of fiber is allowed to cool before the frozen-in viscoelastic strain has completely relaxed, a controlled amount of frozen-in viscoelastic strain and refractive index change will remain in fiber section.

Returning to FIG. 1, the three sections 12, 14 and 16 of the beam expander 10 are fabricated according to the techniques described above. The single-mode section 12 of the beam expander is created by using as-drawn fiber, which has the refractive index profile shown in FIG. 6. The multimode section 16 of the beam expander is created by fully relaxing a portion of the optical fiber. The transition section 14 is created by applying a heat source to a section of fiber such that the section is smoothly modulated from an as-drawn strain state to a fully relaxed strain state. When the fiber has been fully relaxed, because the refractive index of the cladding has returned to its relaxed, preform level, the single-mode core essentially vanishes, and a multimode core emerges in its place, resulting in a much larger modefield. The single mode portion 12 of the beam expander 10 can then be connected to standard SMF fiber with minimal loss. According to a further aspect of the invention, the heat applied along the length of the transition section is modulated so as to produce an adiabatic transition between the strained and unstrained refractive index profiles.

Figure 7:
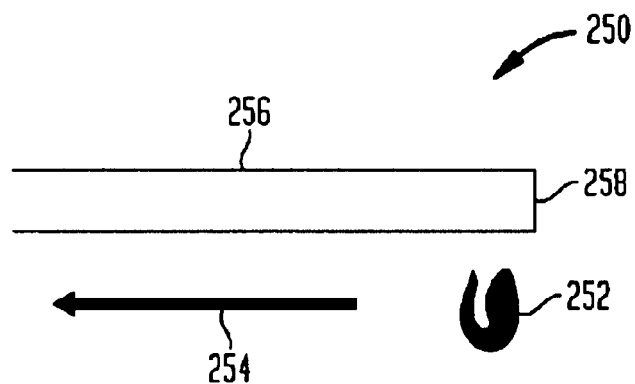
FIG. 7 shows a setup for applying heat to a fiber in accordance with a further aspect of the invention.

In order to produce the desired modulation of the transition section, heat is applied to the transition section so as to provide a smooth tapering of the amount of relaxation of the frozen-in viscoelastic strain state. FIG. 7 shows a diagram of a heating setup 250 according to an aspect of the invention. In this approach, the heating setup 250 includes a constant heat source 252 that is moved in the direction indicated by the arrow 254 along the length of a section of optical fiber 256, starting at the fiber's cleaved end 258. The heating setup 250 may be implemented, for example, using a fusion splicer having a heat source that can be scanned down the length of a fiber loaded into the splicer. It would also be possible to hold the heat source stationary while the fiber is moved, or to move both the heat source and the fiber relative to each other.

In a second approach, a variable heat source to produce the desired modulation. For example, such a heat source may vary in intensity along the length of the fiber. Such an approach may be combined with motion of the heat source relative to the fiber.

In a third approach, varying amounts of tension may be applied to the fiber while the fiber is heated near its strain point or above. Such a varying amount of tension may be used to create a modulation in an already existing frozen-in strain state or to create an entirely new strain state. In this approach, temperature and tension conditions are chosen such that the process does not substantially alter the original fiber diameter. It should be note that some or all of the first, second, and third approaches may be combined with each other or combined with other approaches not specifically disclosed herein without departing from the spirit of the invention.

Figure 8:
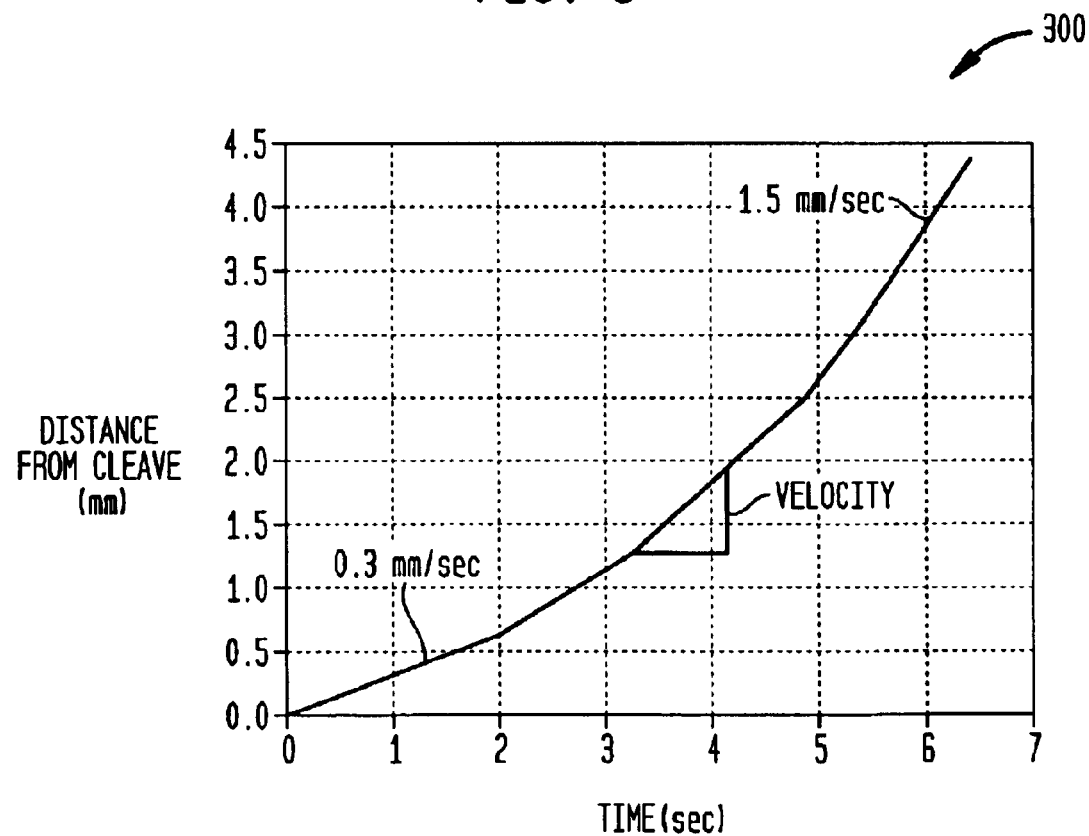
FIG. 8 shows a velocity profile for scanning the heat source down the length of the fiber in FIG. 7.

FIG. 8 is a graph of a velocity profile 300 for moving the constant heat source 252 along the length of the fiber 256. The heat source 252 is applied starting at the cleaved end 258 of the fiber and then advanced down the length of the fiber. As shown in FIG. 8, the heat source travels approximately 4.4 mm in approximately 6.3 seconds, accelerating to 1.5 mm/sec from an initial velocity of 0.3 mm/sec. Thus, the cleaved end 258 of the fiber receives the maximum exposure to the heat source 252. The amount of heat applied to the fiber then tapers off down the length of the fiber.

Because it receives the maximum amount of heat exposure, the cleaved end 258 of the fiber experiences the greatest amount of relaxation of frozen-in viscoelastic strain. The amount of strain relaxation gradually decreases down the length of the fiber. Applying heat using the velocity profile shown in FIG. 8 produces an adiabatic transition between a multimode section at the cleaved end 258 of the fiber and a single-mode section away from the cleaved end 258.

Figure 9:
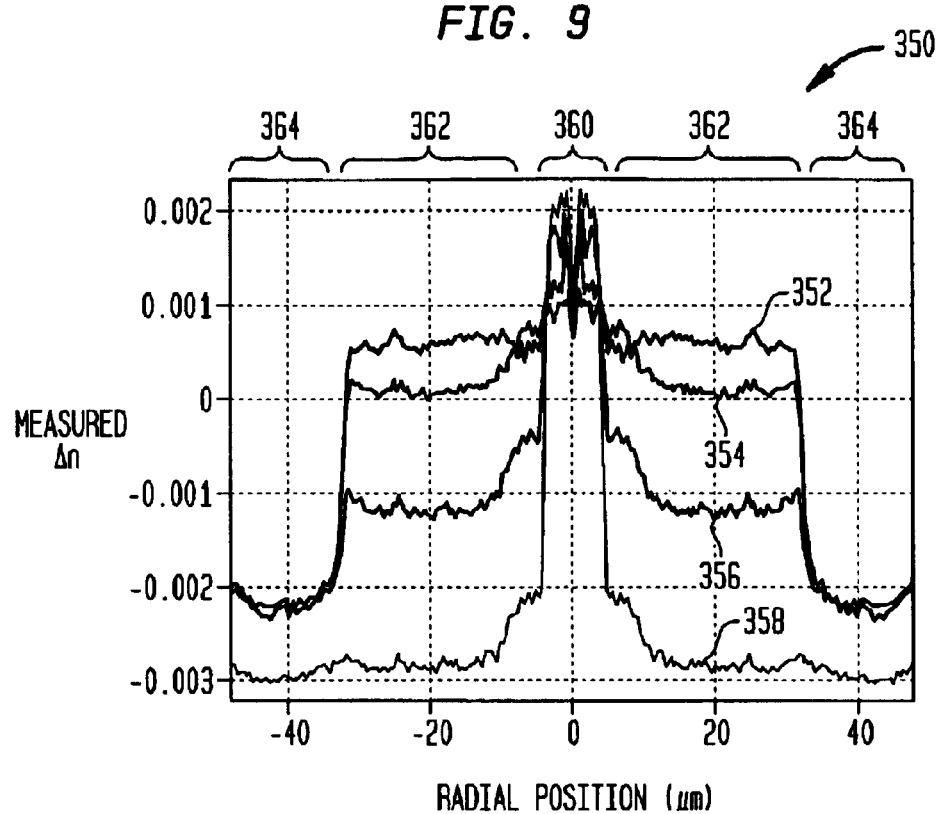
FIG. 9 shows a series of traces illustrating changes in the refractive index profile in a beam expander according to an aspect of the invention.
Figure 10:
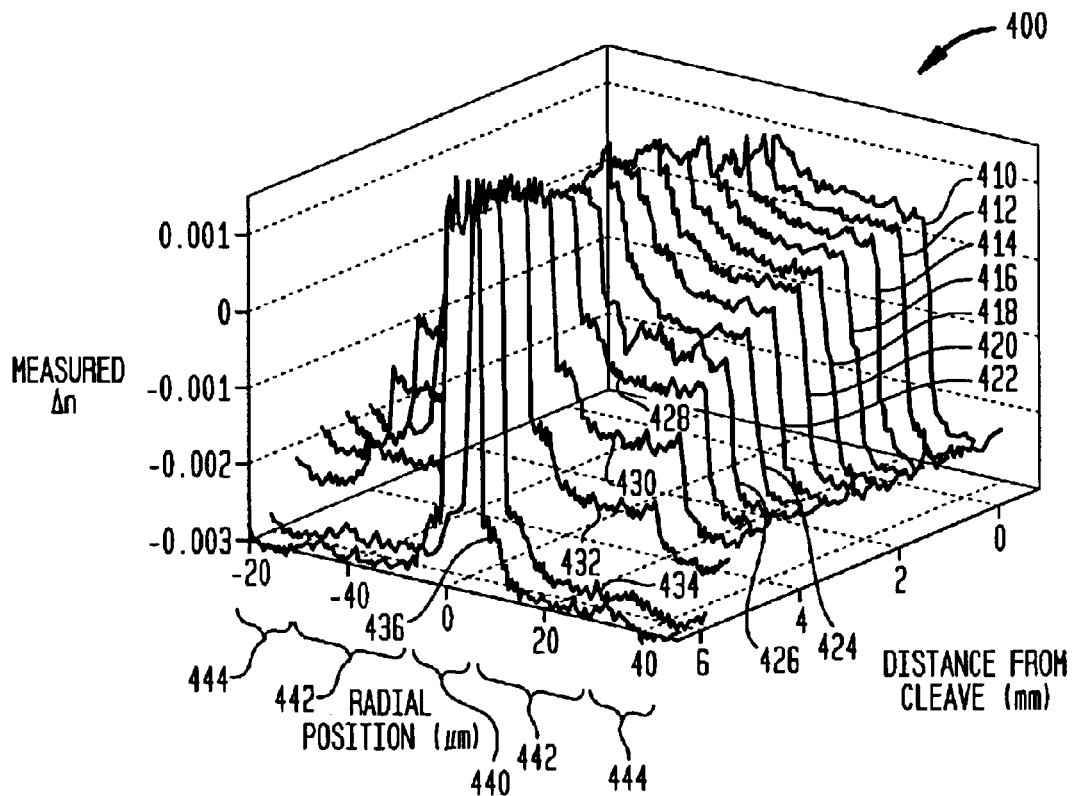
FIG. 10 shows a three-dimensional graph illustrating changes in the refractive index profile in a beam expander according to an aspect of the invention.

FIGS. 9 and 10 are graphs 350 and 400 illustrating the modulation of the refractive index in an optical device fabricated according to the above-described techniques. FIG. 9 shows four traces 352–358 illustrating the refractive index profile of the optical fiber at four different locations along the length of the fiber. The uppermost trace 352 shows the refractive index profile at the cleaved end. The second uppermost trace 354 shows the refractive index profile at a distance of 3 mm from the cleaved end. The third trace 356 shows the refractive index profile at a distance of 5 mm from the cleaved end. The bottom trace 358 shows the refractive index profile at a distance of 6 mm from the cleaved end. As shown in FIG. 9, each trace 352–358 includes a spike region 360 corresponding to the core region of the fiber, a plateau region 362 corresponding to the cladding region of the fiber, and a valley region 364 corresponding to the overcladding region of the fiber. As shown in FIG. 9, the refractive index of the plateau region 362 is at its highest level at the cleaved end, corresponding to trace 352, and is successively lower as the distance from the cleaved end is increased.

FIG. 10 shows a three-dimensional graph 400 illustrative the refractive index of the beam expander. The refractive index is graphed on the x- and y-axes. The z-axis represents distance from the cleaved end of the fiber. Each refractive index profile 410–436 includes a central spike region 440 corresponding to the core region of the fiber, a plateau region 442 on either side of the spike 440 corresponding to the cladding region of the fiber, and a valley region 444 on either side of the plateau region 442 corresponding to the overcladding region of the fiber. As shown in FIG. 10, the refractive index of the cladding region is at its highest point at the cleaved end of the fiber, corresponding to trace 410, and is progressively lower as the distance from the cleaved end increases.

Figure 11:
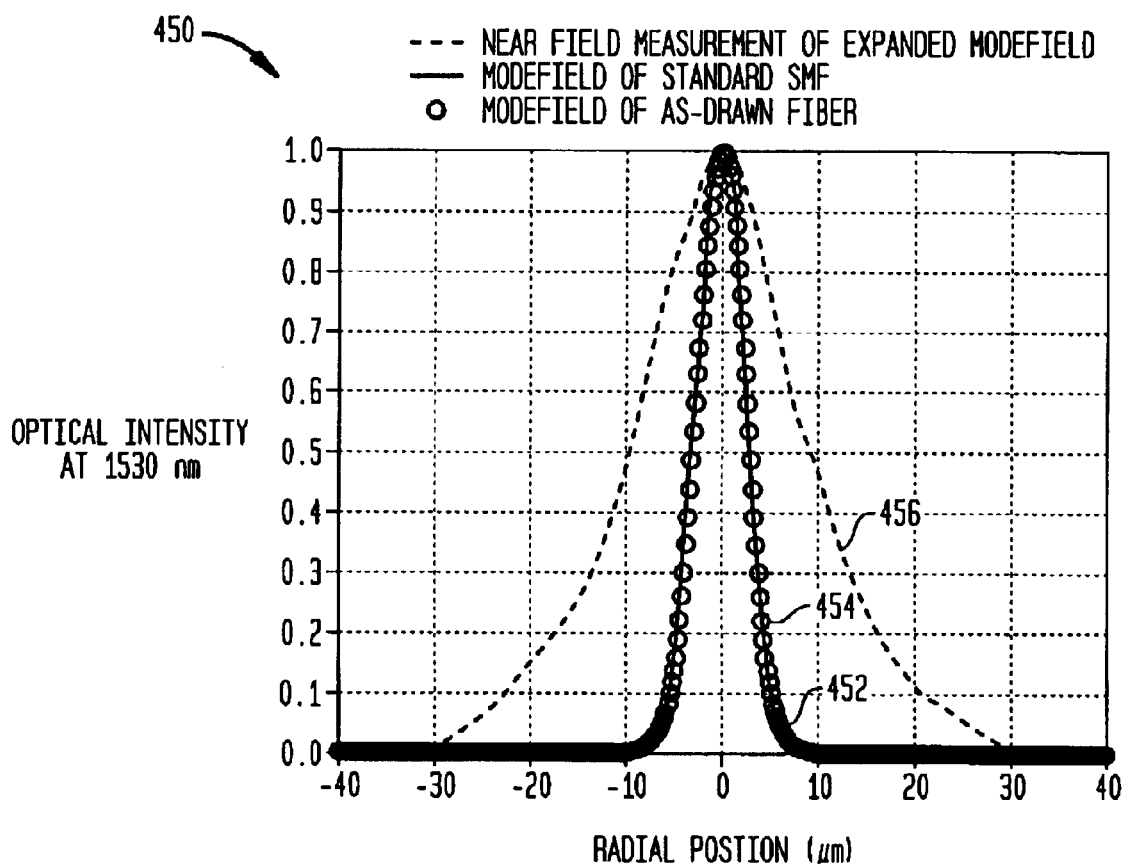
FIG. 11 is a graph comparing modefields of a single-mode fiber and the single-mode and multimode sections of a beam expander according to an aspect of the invention.

FIG. 11 shows a graph 450 that compares the respective modefields of a SMF-28 single-mode fiber 452, the single-mode portion of the beam expander 454, and the multimode portion of the beam expander 456. The expanded modefield was measured at 1550 nm using a near field scanning technique, while the smaller mode fields were numerically computed from refractive index measurements. This particular beam expander magnifies the modefield by approximately four times.

Figure 12:
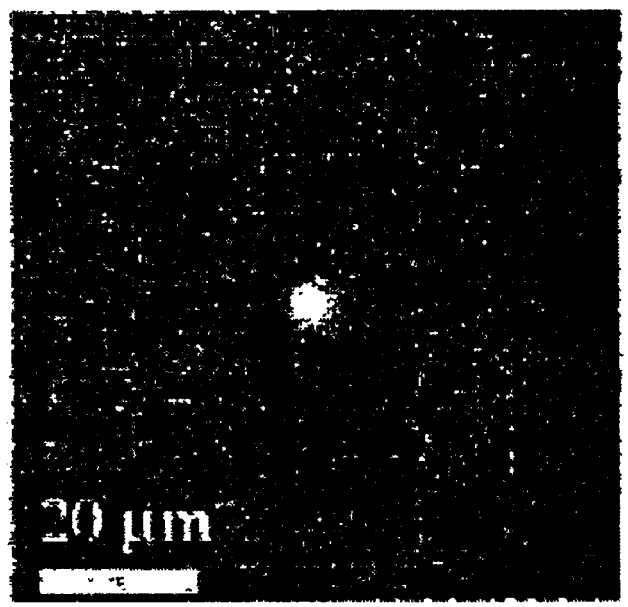
FIGS. 12 and 13 are images of modefields of the single-mode and multimode sections of a beam expander according to an aspect of the invention.
Figure 13:
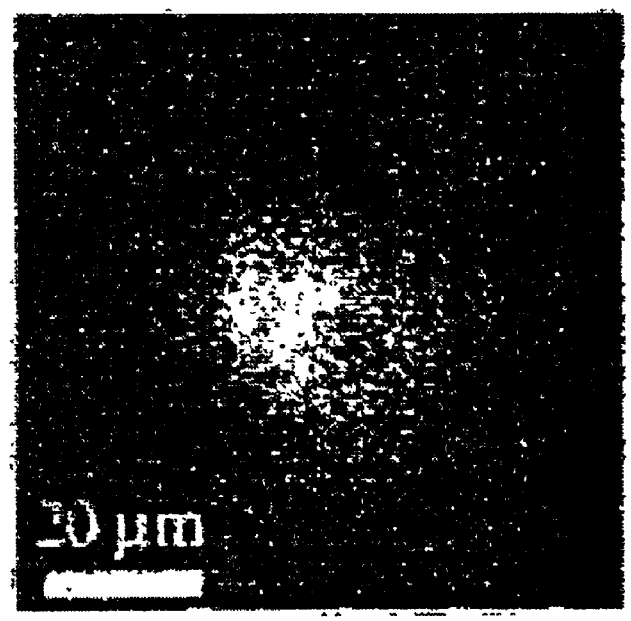

FIGS. 12 and 13 show respective modefield images 500 and 520 of the single-mode and multimode sections of another beam expander. The images shown in FIGS. 12 and 13 were obtained with a microscope objective and CCD camera at 1310 nm. FIGS. 11–13 show that the modefield of the multimode section of the beam expander is significantly larger than the modefield of the as-drawn fiber. This particular beam expander magnifies the modefield diameter by approximately three times.

An alternative strategy for creating a beam expander is to use a high-viscosity glass such as pure silica for the core and a low-viscosity, low-refractive index glass, such as fluorine-doped silica, as the cladding. When this fiber is drawn at sufficiently high tension, frozen-in viscoelastic strains will reduce the core index of refraction to the point where it matches the down-doped cladding index. Such a fiber could be coated with a low-index polymer, so that the fiber will function as a large modefield diameter multimode fiber. If the viscoelastic strains are relaxed in a portion of the fiber and the single-mode core gradually emerges along the length of the fiber, the multimode portion of the fiber smoothly evolves into a single-mode fiber thus creating a beam expander similar to that detailed above.

Figure 14:
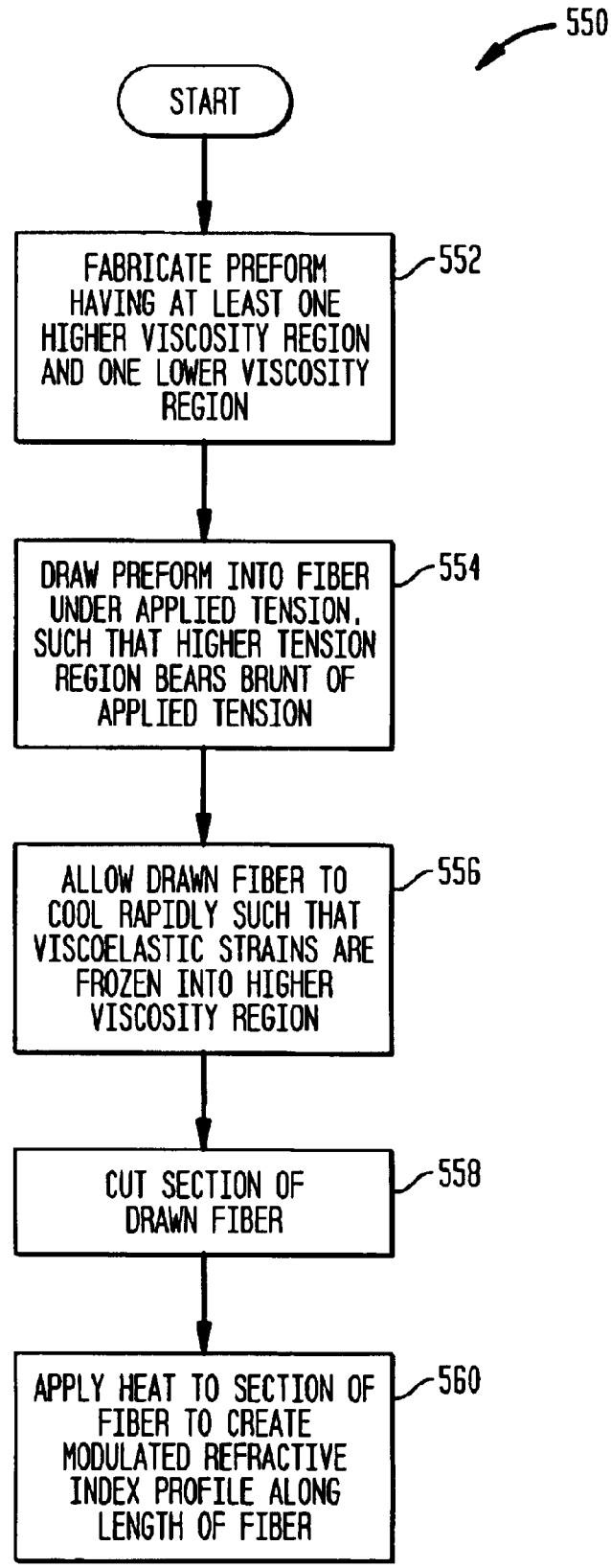
FIG. 14 is a flowchart of a method according to an aspect of the invention for fabricating a beam expander.

FIG. 14 shows a flowchart 550 illustrating a method according to the invention. In step 552, a preform is fabricated, having a plurality of regions, at least one region having a higher viscosity, and at least one region having a lower viscosity. In step 554, the preform is drawn into optical fiber under applied tension, such that a viscoelastic strain is induced in a higher viscosity region of the fiber. In step 556, the fiber is allowed to cool rapidly, such that the viscoelastic strain is frozen into the fiber region. In step 558, a section of the drawn fiber is cut. In step 560, heat is applied to the section of cut fiber so as to create a modulated refractive index profile along the length of the fiber section.

EXAMPLE 2

Bridge Fiber

A further aspect of the invention provides a technique for fabricating a bridge fiber, which is an optical device that is used, for example, to reduce splice loss between two optical fibers with different modefield shapes. As used throughout the present specification and claims, the term "splice" generally refers to any connection between optical fibers, including a fusion splice, a mechanical splice, or other connection technique. Bridge fibers are designed that the total splice loss with the bridge fiber is less than the direct splice loss without the bridge fiber. Bridge fibers are used, for example, in advanced dispersion-managed optical fiber systems, which typically require low-loss connections between radically different fiber designs in order to achieve desirable overall dispersion characteristics. Certain dispersion-managed optical fiber systems call for frequent connections between alternating fiber designs. If these connections exhibit excessive loss, the dispersion managed optical fiber system will not meet performance requirements. Thus, effective bridge fibers can serve as an enabling technology for advanced dispersion-managed optical fiber systems. According to an aspect of the invention, a varying-waveguide optical fiber fabricated by modulating the frozen-in strain state can serve as an effective bridge fiber for these optical fiber systems.

Figure 15:
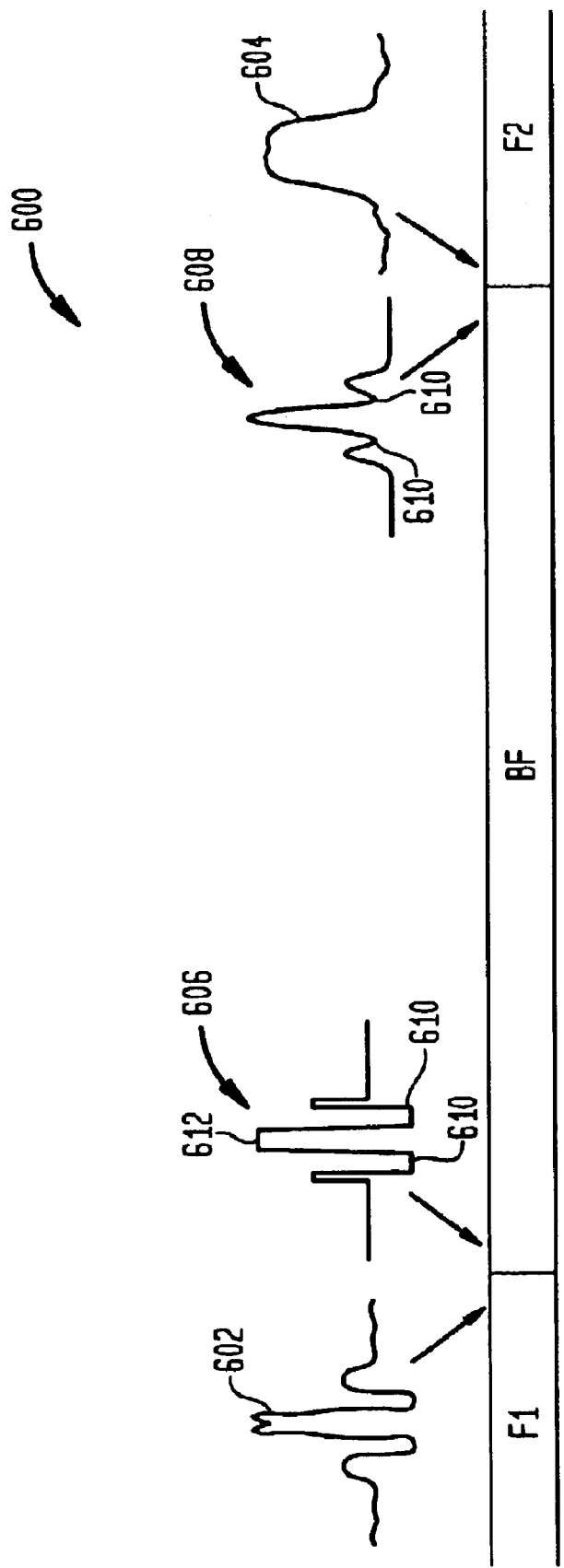
FIG. 15 shows a diagram of an optical transmission line incorporating a bridge fiber according to a further aspect of the invention.

FIG. 15 is a diagram illustrating an optical fiber transmission line 600 incorporating the bridge fiber concept. The transmission line 600 includes a first fiber F1 and a second fiber F2 with very different respective refractive index profiles 602 and 604 and therefore different modefields, resulting in high direct splice loss between the two fibers. A bridge fiber BF is connected between the two fibers F1 and F2 to reduce the total splice loss. The bridge fiber may be connected to fibers F1 and F2 using fusion splices, mechanical splices, or other suitable connection techniques, or combinations thereof.

The bridge fiber is specially designed provide a low-loss transition between a first end having a refractive index profile 606 and modefield shape matching that of the first fiber F1 and a second end having a refractive index profile 608 and modefield shape matching that of the second fiber F2. As shown in FIG. 15, the refractive index profile 606 of the first end of the bridge fiber BF includes a pair of trenches 610 on either side of a central spike 612 corresponding to the core of the bridge fiber BF. In the refractive index profile 608 at the second end of the bridge fiber BF, the trenches 610 have a substantially decreased size.

As used herein, the refractive index profile of an end of the bridge fiber BF is said to "match" the refractive index profile of a fiber connected to the bridge fiber when the respective shapes of the two refractive index profiles provide a sufficient modefield overlap that allows the fibers to be connected together with an acceptably small splice loss. Thus, as illustrated in FIG. 15 that the refractive index profile 602 of the first fiber F1 need not be identical to the refractive index profile 606 of the first end of the bridge fiber BF. Similarly, the refractive index profile 604 of the second fiber F2 need not be identical to the refractive index profile 608 of the second end of the bridge fiber 608.

Figure 16:
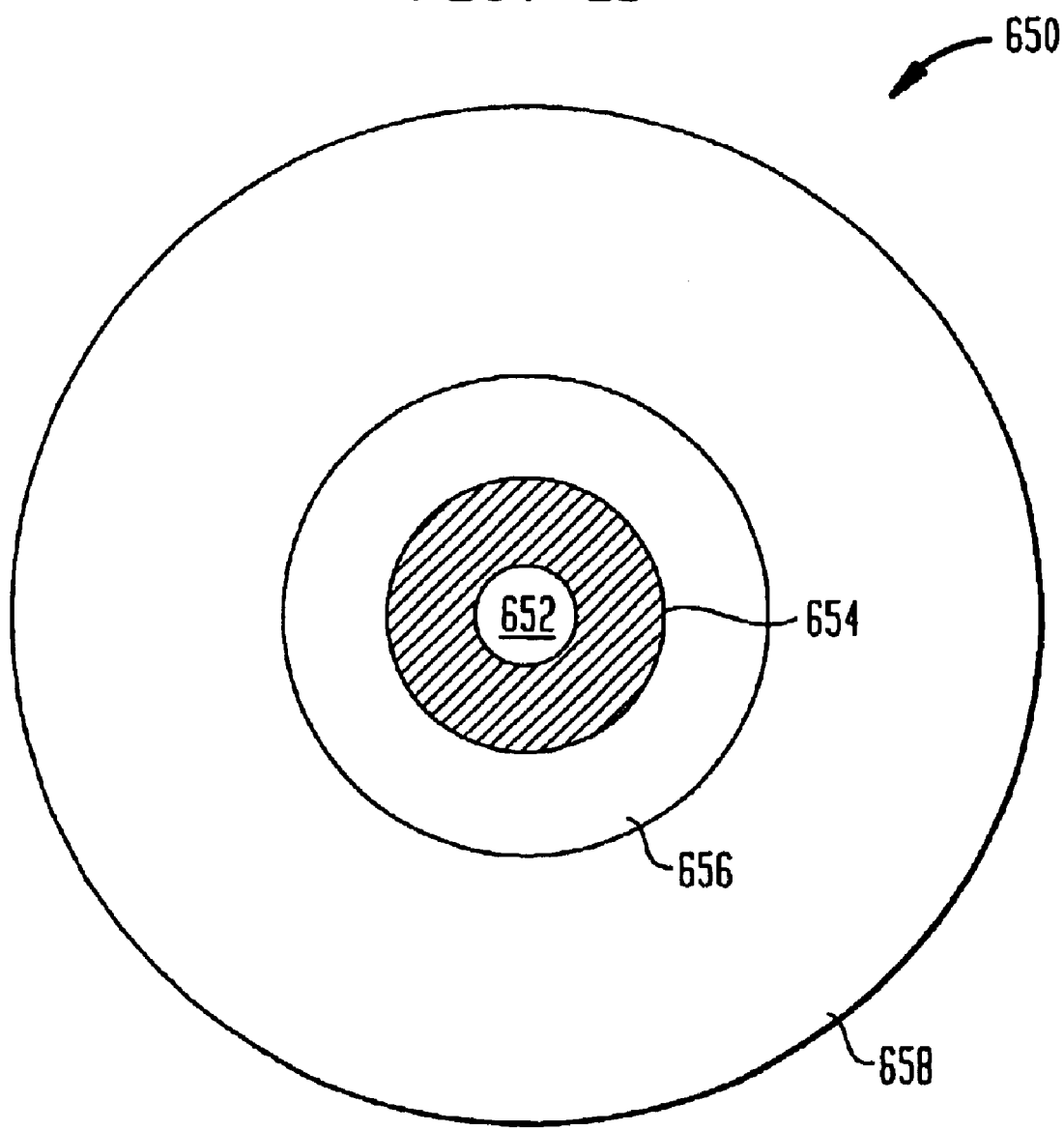
FIG. 16 shows a cross section of a preform suitable for fabricating a bridge fiber for use in an optical transmission line such as that illustrated in FIG. 15.

According to an aspect of the invention, a bridge fiber is fabricated by modulating the fiber's frozen-in viscoelastic strain state. The technique used is similar to the technique described above for fabricating a beam expander. Again, the process begins with the fabrication of a suitable preform. FIG. 16 shows a radial cross section of a suitable preform 650. The preform includes a Ge-doped core region 652. Surrounding the core is an annular, pure silica region 654, which is cross-hatched for purposes of illustration. Surrounding the pure silica region 654 is a Ge-doped ring 656. Surround the Ge-doped ring is a low-viscosity overclad 658. The viscosity of the pure silica region 654 is significantly higher than the viscosity of the core region 652, the Ge-doped ring 656, and the overcladding region 658.

The cross-sectional area of the high-viscosity, pure silica region 654 is purposely designed to be relatively small, thus producing relatively large changes in the refractive index when optical fiber is drawn from the preform 650 under a non-zero applied tension. The other regions of the preform have a relatively low viscosity to ensure that viscoelastic strains will be preferentially frozen into the pure silica region 654, thus producing a deep trench in the refractive index surrounding the core region 654.

Figure 17:
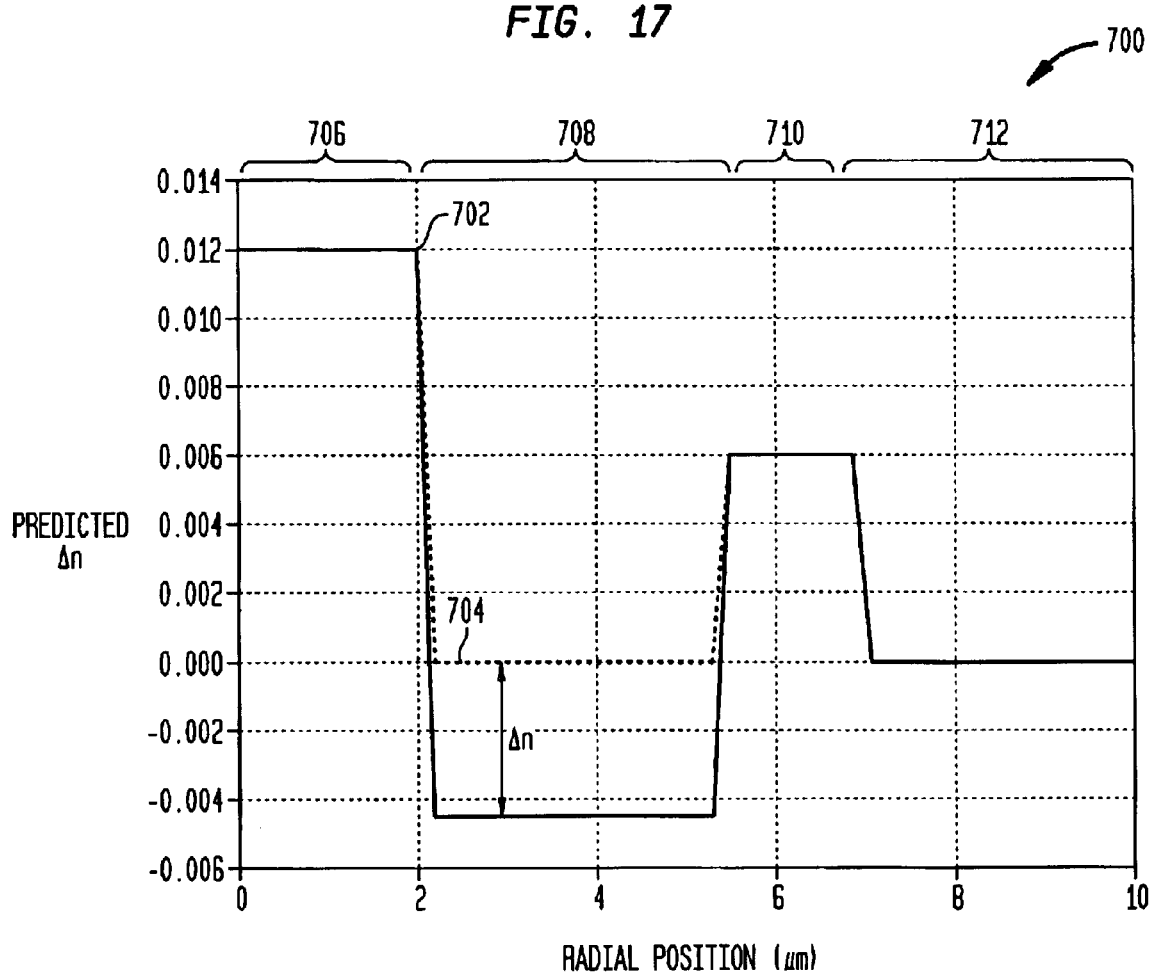
FIG. 17 shows as-drawn and fully relaxed refractive indices for an optical fiber drawn under applied tension from the preform shown in FIG. 16.

FIG. 17 shows a refractive index profile of an optical fiber drawn from the preform shown in FIG. 16. The solid trace 702 shows the as-drawn refractive index profile, and the broken line 704 shows the fully relaxed refractive index profile. Each profile includes a spike 706 corresponding to the core region of the fiber 652, a trench region 708 corresponding to the pure silica region 654, a peak 710 corresponding to the Ge-doped ring 656, and a flat region 712 corresponding to the overcladding 658. As illustrated in FIG. 17, the two refractive index profiles 702 and 704 differ primarily in the refractive index of the pure silica region 708. The trench 708 is more pronounced in the as-drawn fiber, and is substantially flattened out in the fully relaxed fiber.

The first refractive index 702 is designed to match that of the first fiber F1, and the second refractive index 704 is designed to match that of the second fiber F2. The techniques used to fabricate the above-described beam expander may be used here to create an adiabatic transition between the first and second refractive index profiles 702 and 704.

A fusion splice between the first fiber F1 and the bridge fiber BF is performed at a relatively low temperature with a relatively short splicing time to minimize diffusion of the fiber dopant. Typically, fusion splicing a fiber requires heating it to a high temperature, approximately 1,900° C., sufficient to cause an immediate relaxation of frozen-in viscoelastic strains in the vicinity of the splice. The deep refractive index trench in the pure silica region in the as-drawn fiber results from frozen-in viscoelastic strain and must be present to achieve a low-loss splice to the first fiber F1. In order to restore the frozen-in viscoelastic strains, and hence the deep refractive index trench, the completed splice is cooled down from a temperature well above the strain point while maintaining tension on the fiber on the order of 100 grams.

The fusion splicer is then used to splice the second end of the bridge fiber BF to the second fiber F2, using splice conditions that allow the strains in the bridge fiber to be relaxed to reduce the trench in the index profile. The fusion splice between the bridge fiber BF and the second fiber F2 is deliberately performed at relatively high temperature and with a relatively long splice time to cultivate substantial dopant diffusion, thereby further reducing splice loss. It should be noted that the splices may be performed in any order, or simultaneously, without departing from the spirit of the invention.

A more conventional bridge fiber design using only dopant diffusion to reduce splice loss yielded total fusion splice losses of 0.4 dB between the first and second fibers F1 and F2. Numerical modeling of the varying-waveguide optical bridge fiber design described here predicts that a total splice loss of 0.1 dB. Thus, the bridge fiber described here is expected to provide a significant benefit to advanced dispersion-managed optical fiber systems fabricated from fibers F1 and F2.

Figure 18:
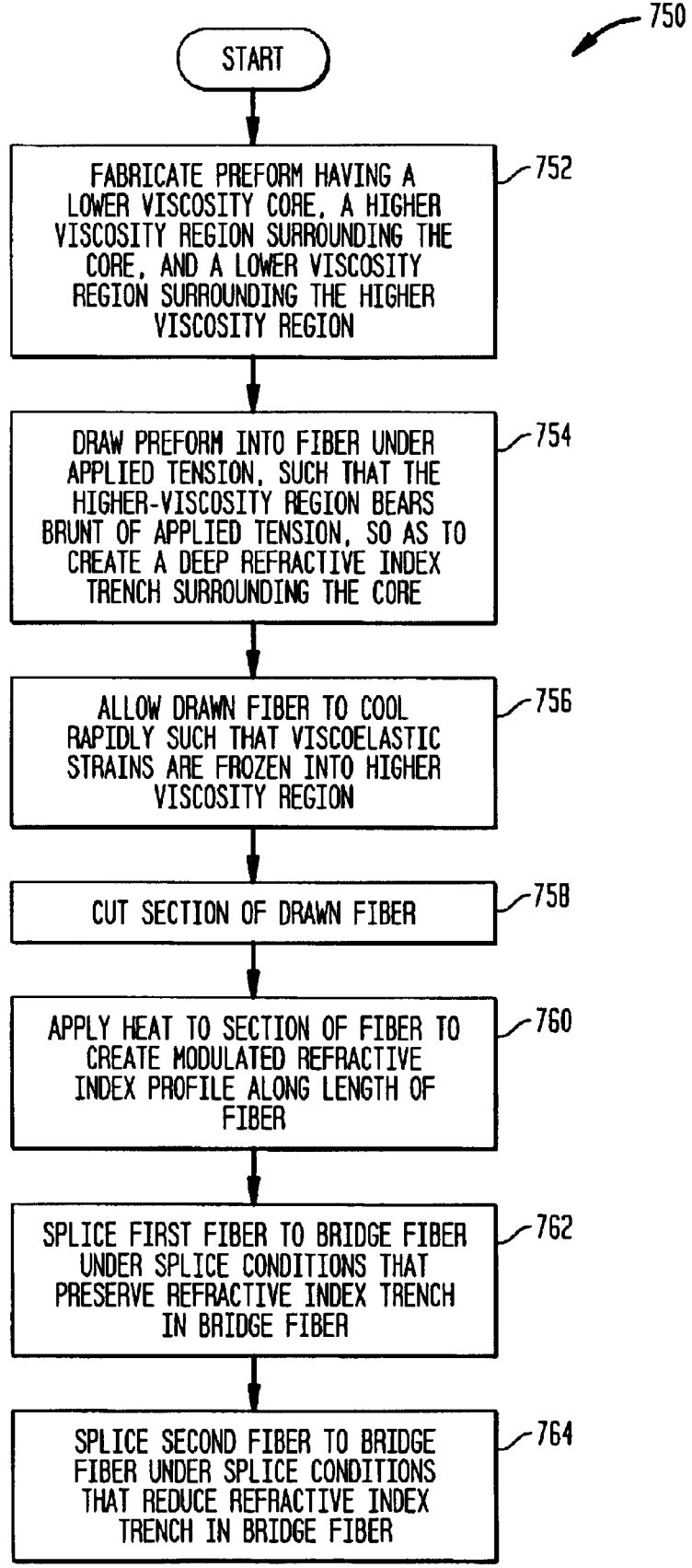
FIG. 18 shows a flowchart of a method according to a further aspect of the invention for fabricating an optical transmission line incorporating a bridge fiber.

FIG. 18 shows a flowchart illustrating a method 750 according to a further aspect of the invention. In step 752, a preform is fabricated having a lower viscosity core, a higher viscosity region surrounding the core, and a lower viscosity region surrounding the higher viscosity region. In step 754, the preform is drawn into fiber under applied tension, such that the higher viscosity region bears the brunt of the applied tension, so as to create a deep refractive index trench surrounding the core. In step 756, the drawn fiber is allowed to cool rapidly, such that viscoelastic strains are frozen into the higher viscosity region. In step 758, a section is cut from the fiber. In step 750, heat is applied to the fiber section to create a modulated refractive index profile along the length of the fiber, thus producing a bridge fiber. In step 762, a first fiber is spliced to a first end of the bridge fiber under splice conditions that preserve the refractive index trench in the fiber. In step 764, a second fiber is spliced to the second end of the bridge fiber under splice conditions that reduce the refractive index trench. In addition, the splice conditions may also be chosen to cause dopant diffusion to further reduce splice loss.

EXAMPLE 3

Fiber Grating

Figure 19:
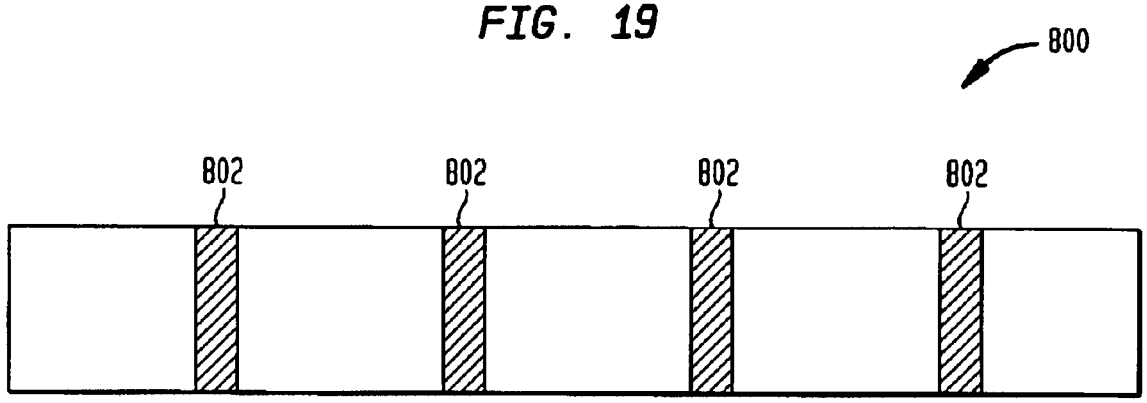
FIG. 19 shows a diagram of a long-period fiber grating according to a further aspect of the invention.

A further aspect of the present invention provides a technique for fabricating a fiber grating, such as a long-period grating. A long-period grating is an optical fiber with a periodic perturbation along its length that exchanges power between two modes, such as between a core-guided mode and a cladding-guided mode. FIG. 19 shows a schematic diagram of a grating 800 illustrating the period perturbations 802 in refractive index. It will be seen that the fiber grating 800 shown in FIG. 19 differs from the beam expander and the bridge fiber described above, in that the refractive index profile of the fiber grating 800 is modulated in a periodic way, whereas in the beam expander and the bridge fiber, the respective refractive index profiles are modulated in a non-periodic or monotonic way.

Currently, fiber gratings are typically manufactured using a number of techniques. In one technique, two intersecting ultraviolet laser beams create a periodic fringed interference pattern. The fiber core is positioned in the interference pattern, causing permanent periodic changes in the refractive index of the optical fiber. In another currently used technique, a mask is used to create a periodic pattern in fiber exposed to an ultraviolet laser beam through the mask.

Figure 20:
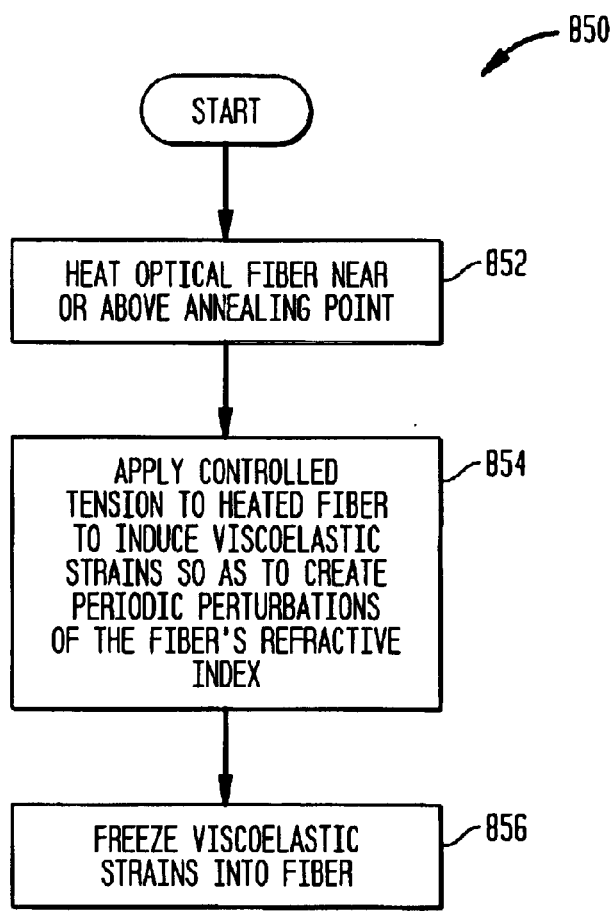
FIG. 20 shows a flowchart of a method according to a further aspect of the invention for fabricating a fiber grating.

FIG. 20 shows a flowchart of a method 850 according to an aspect of the invention. In step 852, an optical fiber is heated approximately to its strain point or above. In step 854, a controlled, non-zero tension is applied to the fiber to create an entirely new viscoelastic strain state in the fiber. It should be noted that viscoelastic strains also affect the photosensitivity of an optical fiber, including the sensitivity of the optical fiber to ultraviolet radiation. The new viscoelastic strain state induced by the controlled, applied tension produces periodic perturbations of the refractive index of the fiber. In step 856, the fiber is cooled rapidly to allow the periodic perturbations to be frozen into the fiber. In order to prevent the induced strains from relaxation out of the fiber before they can be frozen in, the applied tension may be maintained as the fiber cools. According to a further aspect of the invention, desirable spectral characteristics are obtained when the period of the perturbation is on the order of 500 µm.

EXAMPLE 4

Low-Loss Splicing

Finally, according to an aspect of a related invention, splice loss between two optical fibers is reduced by maintaining tension on the splice while the splice is cooled down from a temperature well above the fiber's strain point. According to this aspect of the invention, a favorable refractive index profile is imparted to the fibers at the splice joint by freezing a favorable viscoelastic strain state into the fibers there. This aspect of the invention is the subject of a related patent application, Ser. No. 10/190,137, which is being filed on the same date as the present application.

Figure 21:
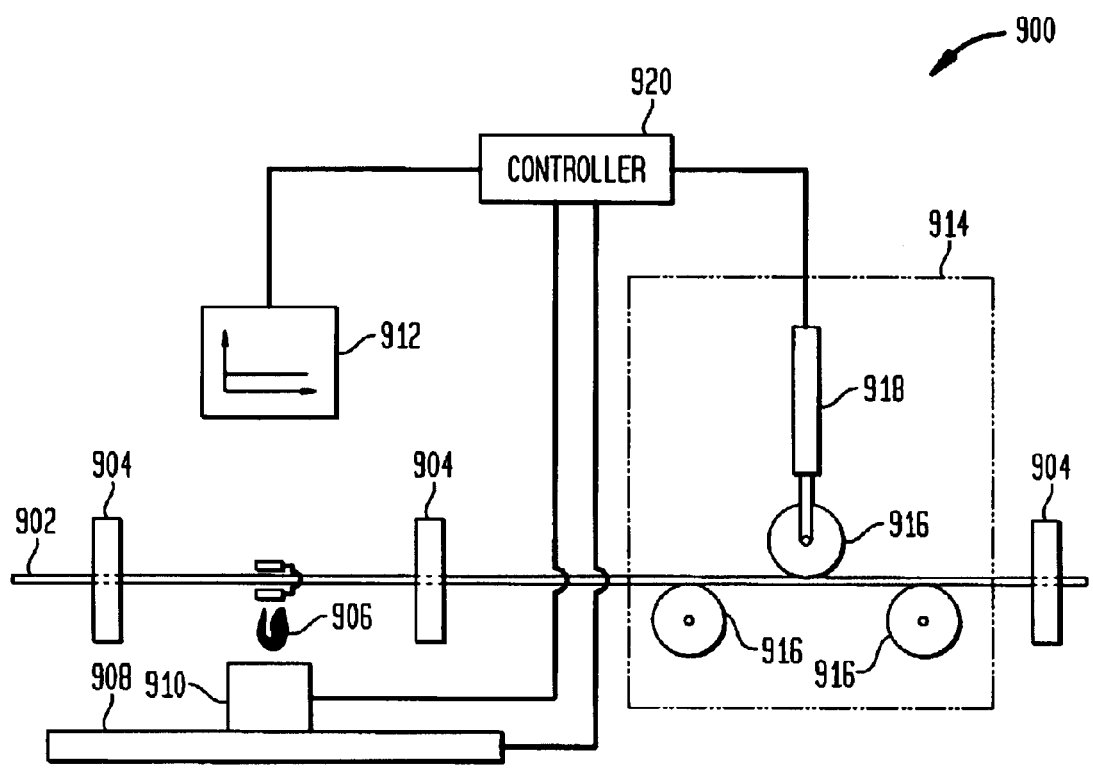
FIG. 21 shows a diagram of a system for fabricating an optical fiber device according to a further aspect of the invention.

FIG. 21 shows a diagram of a system 900, according to a further aspect of the invention, for fabricating an optical device by manipulating the viscoelastic strain state of an optical fiber 902. The system 900 includes a plurality of fiber guides 904 for holding the fiber 902 in position for processing. As described above, the viscoelastic strain in an optical fiber is manipulated by using a heat source 906 to heat the fiber to, or above, its strain point and applying a controlled tension to the fiber or allowing frozen-in strains to relax. The heat source 906 is mounted to a translation stage 908 that allows the heat source 906 to be scanned down the length of the fiber 902. In addition, the system 900 includes a suitable mechanism 910 for adjusting the intensity of the heat applied to the fiber 902. The system 900 further includes a suitable measurement device 912 for monitoring the optical properties of the fiber 902 as it is processed. The measurement device 912 may be, for example, an optical power meter, an optical spectrum analyzer, a beam profiler, a refractive index profiler, an imaging system, or other measurement apparatus.

The system 900 further includes a mechanism 914 for applying tension to the fiber 902. The mechanism 914 includes a series of guide rollers 916, each roller 916 having a radius sufficiently large to prevent damage to the optical fiber 902. Tension is applied to the optical fiber 902 through the use of a piston assembly 918. However, other techniques may be used to apply tension without departing from the spirit of the invention.

According to a further aspect of the invention, a microprocessor controller 920 is used to control the various components of the system 900, including the intensity and position of the heat source 906, and tension applied to the fiber 902. The controller 920 also monitors the optical properties of the fiber through the measurement device 912, which provides feedback to the controller 920.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method for fabricating an optical fiber device, comprising:

(a) fabricating a preform including a core and at least one cladding region, the cladding region having a higher viscosity and the core region having a lower viscosity, the relative viscosities of the cladding region and core having been chosen such that, when tension is applied to an optical fiber drawn from the preform, the applied tension is primarily borne by the cladding region, thereby causing a viscoelastic strain to be frozen into the cladding region, while creating a minimal viscoelastic strain in the core;

(b) drawing the preform into an optical fiber under an applied tension, such that a viscoelastic strain is frozen into the cladding region, the frozen-in viscoelastic strain decreasing the cladding region refractive index;

(c) changing the cladding region refractive index in a section of the optical fiber by heating the section of optical fiber so as to relax the viscoelastic strain frozen into the cladding region in the section of optical fiber, thereby increasing the cladding region refractive index in the section of optical fiber.

2. The method of claim 1, wherein step (c) includes applying a controlled amount of heat to the section of optical fiber, the amount of heat being modulated to cause a modulated relaxation of the cladding region in the section of optical fiber, thereby causing a modulated change in the cladding region refractive index in the section of optical fiber.

3. The method of claim 2, wherein step (c) further includes:

applying modulated amounts of heat along the section of optical fiber so as to cause a modulated relaxation in the frozen-in strain state of the cladding region in the section of optical fiber, thereby causing a modulated increase of the cladding region refractive index in the section of optical fiber.

4. The method of claim 3, wherein step (c) further includes:

using a stationary heat source that is tailored to produce a heating profile that is designed to cause a modulated relaxation in the frozen-in strain state of the cladding region in the section of optical fiber.

5. The method of claim 2, wherein step (c) further includes:

applying a controlled amount of heat to the section of optical fiber by scanning a heat source along the section of optical fiber according to a velocity profile so as to cause a modulated relaxation of the frozen-in viscoelastic strain in the cladding region in the section of optical fiber, thereby causing a modulated increase of the cladding region refractive index.

6. The method of claim 1, in which the fiber is heated to create three sections:

a first section having a first modefield diameter;

a second section having a second modefield diameter that is larger than the first modefield diameter; and a transition section between the first section and the second section, the transition section providing an adiabatic transition between the first modefield diameter and the second modefield diameter.

7. The method of claim 6, further including:
coating the fiber with a polymer having a low refractive index.

8. The method of claim 1, wherein the fiber is heated to create three sections:
a first section having a refractive index profile matching that of a first fiber design;
a second section having a refractive index profile matching that of a second fiber design; and
a transition section between the first section and the second section, the transition section providing an adiabatic transition between the first refractive index profile and the second refractive index profile, whereby the device may serve as a low-loss bridge connecting a fiber of the first design with a fiber of the second design.

9. A method for fabricating an optical device, comprising:
(a) fabricating an optical fiber including a core and at least one cladding region outside of the core, the cladding region having a higher viscosity and the core having a lower viscosity, the relative viscosities of the cladding region and core having been chosen such that, when tension is applied to the optical fiber, the applied tension is primarily borne by the cladding region, thereby allowing a viscoelastic strain to be frozen into the cladding region, while creating a minimal viscoelastic strain in the core;
(b) heating a section of the fiber at or above its strain point while applying a non-zero tension to the region so as to induce a viscoelastic strain state in the cladding region thereby changing the cladding region refractive index;
(c) freezing the viscoelastic strain state into the fiber;
thus producing a refractive index profile that is modulated along the fiber's length.

10. The method of claim 9, wherein the fiber is heated to create three sections:
a first section having a first modefield diameter;
a second section having a second modefield diameter that is larger than the first modefield diameter;
a transition section between the first section and the second section, the transition section providing an adiabatic transition between the first and second modefield diameters.

11. The method of claim 10, further including:
coating the fiber with a polymer have a low refractive index.

12. The method of claim 9, wherein step (b) includes applying along the length of the region a controlled amount of heat that is tailored to cause a modulated change in the viscoelastic strain state of the cladding region in the section of fiber, thereby causing a modulated change in the cladding region refractive index in the section of fiber.

13. The method of claim 9, wherein the fiber is heated to create three sections:
a first section having a refractive index profile matching that of a first fiber design;
a second section having a refractive index profile matching that of a second fiber design; and
a transition region between the first region and the second region, the transition region providing an adiabatic transition between the first refractive index profile and the second refractive index profile, whereby the device may serve as a low-loss bridge connecting a fiber of the first design with a fiber of the second design.

14. A method for fabricating an optical device, comprising:
(a) fabricating an optical fiber including a core and at least one cladding region, the cladding region having a higher viscosity and the core having a lower viscosity, the relative viscosities of the cladding and core regions having been chosen such that, when tension is applied to the optical fiber, the applied tension is primarily borne by the cladding region thereby allowing a viscoelastic strain to be frozen into the cladding region, while creating a minimal viscoelastic strain in the core;
(b) heating a section of the fiber to a temperature that is at or near the fiber's strain point; and
(c) applying a controlled tension to the fiber, the applied tension being modulated so as to freeze a modulated strain state into the glass, thereby creating a modulated cladding region refractive index profile.

15. The method of claim 14, wherein step (b) includes applying a controlled amount of heat to the region, the amount of heat being modulated along the length of the section of fiber.

16. The method of claim 15, wherein the heat source is moved relative to the fiber according to a velocity profile that is modulated along the length of the section of fiber.

17. The method of claim 14, in which the fiber is heated to create three sections:
a first section having a first modefield diameter;
a second section having a second modefield diameter that is larger that the first modefield diameter;
and a transition section between the first section and the second section, the transition section providing an adiabatic transition between the first and second frozen-in strain states.

18. The method of claim 17, further including:
coating the fiber with a polymer having a low refractive index.

19. The method of claim 14, wherein the fiber is heated to create three sections:
a first section having a refractive index profile matching that of a first fiber design;
a second section having a refractive index profile matching that of a second fiber design; and
a transition section between the first section and the second section, the transition section providing an adiabatic transition between the first refractive index profile and the second refractive index profile, whereby the device may serve as a low-loss bridge connecting a fiber of the first design with a fiber of the second design.

20. A method for fabricating an optical fiber device, comprising:
(a) fabricating a preform including a core and at least one cladding region, the cladding region having a higher viscosity and the core region having a lower viscosity, the relative viscosities of the cladding and core regions having been chosen such that, when tension is applied to an optical fiber drawn from the preform, the applied tension is primarily borne by the cladding region, thereby causing a viscoelastic strain to be frozen into the cladding region, while creating a minimal viscoelastic strain in the core;
(b) drawing the preform into an optical fiber under an applied tension, such that a viscoelastic strain is frozen into the cladding region, the frozen-in viscoelastic strain decreasing the cladding region refractive index; and (c) modifying the fiber's photosensitivity in a section of the fiber by heating the section so as to relax the viscoelastic strain frozen into the cladding region in the section of fiber.

21. An optical fiber device, comprising:

an optical fiber having a core and at least one cladding region, the cladding region having a higher viscosity and the core region having a lower viscosity, the relative viscosities of the cladding region and core having been chosen such that a desired viscoelastic strain state may be frozen into, or relaxed out of, the cladding region, creating a minimal change in the viscoelastic strain state of the core, the cladding region having a viscoelastic strain state that has been modulated to produce a modulated refractive index along a length of the cladding region.

22. The optical fiber device of claim 21, wherein the viscoelastic strain state of the cladding region has been modulated to create three sections in the optical fiber:

a first section having a refractive index profile matching that of a first fiber design;

a second section having a refractive index profile matching that of a second fiber design; and a transition section between the first section and the second section, the transition section providing an adiabatic transition between the first refractive index profile and the second refractive index profile, whereby the device may serve as a low-loss bridge connecting a fiber of the first design with a fiber of the second design.

23. The optical fiber device of claim 21, in which the fiber is heated to create three sections:

a first section having a first modefield diameter;

a second section having a second modefield diameter that is larger than the first modefield diameter; and a transition section between the first section and the second section, the transition section providing an adiabatic transition between the first modefield diameter and the second modefield diameter.

24. A system for fabricating an optical fiber device, comprising:

at least one fiber guide for holding an optical fiber to be processed;

a heat source for applying a controlled amount of heat to a section of the optical fiber;

a tensioning assembly for applying a controlled tension to the optical fiber;

a measurement device for monitoring optical properties of the optical fiber as it is processed; and a controller for controlling the amount of heat and applied tension based upon the optical properties monitored by the measurement device, the controller using the controlled heat and applied tension to modulate the optical fiber's viscoelastic strain state.

* * * * *